United States Patent
Jaouen et al.

(10) Patent No.: US 11,893,370 B2
(45) Date of Patent: Feb. 6, 2024

(54) SYSTEM AND PROCESS FOR COMPILING A SOURCE CODE

(71) Applicant: STMicroelectronics (Grand Ouest) SAS, Le Mans (FR)

(72) Inventors: Michel Jaouen, Yvre l'Eveque (FR); Stephane Le Roy, St Saturnin (FR); Moise Gergaud, Yvré l'Evêque (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 0 days.

(21) Appl. No.: 17/451,394

(22) Filed: Oct. 19, 2021

(65) Prior Publication Data
US 2022/0164172 A1    May 26, 2022

(30) Foreign Application Priority Data
Nov. 13, 2020 (FR) ...................................... 2011657

(51) Int. Cl.
*G06F 8/41* (2018.01)
*G06F 21/54* (2013.01)
*G06F 21/55* (2013.01)

(52) U.S. Cl.
CPC ................ *G06F 8/44* (2013.01); *G06F 21/54* (2013.01); *G06F 21/55* (2013.01); *G06F 2221/033* (2013.01)

(58) Field of Classification Search
CPC . G06F 8/41–49; G06F 21/54; G06F 2221/033
USPC ....................................................... 717/140
See application file for complete search history.

(56) References Cited

U.S. PATENT DOCUMENTS

| | | | |
|---|---|---|---|
| 2002/0199177 A1* | 12/2002 | Ogawa | G06F 8/4441 717/161 |
| 2007/0250703 A1 | 10/2007 | Giraud et al. | |
| 2020/0089502 A1* | 3/2020 | Hong | G06F 9/3836 |

FOREIGN PATENT DOCUMENTS

| | | | | |
|---|---|---|---|---|
| GB | 2538401 A | * | 11/2016 | ............ G06F 8/41 |
| WO | WO-02057905 A1 | * | 7/2002 | ......... G06F 21/558 |
| WO | WO-2015174512 A1 | * | 11/2015 | ............ G06F 11/30 |
| WO | WO-2019152752 A1 | * | 8/2019 | ............ G06F 21/51 |
| WO | 2020080515 A1 | | 4/2020 | |

OTHER PUBLICATIONS

Code injection, Wikipedia, 2019, 9 pages, [retrieved on Sep. 29, 2023], Retrieved from the Internet: <URL:https://web.archive.org/web/20190220014439/https://en.wikipedia.org/wiki/Code_injection>.*

De Keulenaer, Ronald et al., "Link-time smart card code hardening", Int. J. Inf. Secur., 15:111-130, DOI 10.1007/s10207-015-0282. 0, CrossMark, Mar. 27, 2015, 20 pages.

* cited by examiner

Primary Examiner — Geoffrey R St Leger
(74) Attorney, Agent, or Firm — Slater Matsil, LLP

(57) ABSTRACT

According to one aspect, a method for compiling by a compilation tool a source code into a computer-executable code comprises receiving the source code as input of the compilation tool, translating the source code into an object code comprising machine instructions executable by a processor, then introducing, between machine instructions of the object code, additional instructions selected from illegal instructions and no-operation instructions so as to obtain the executable code, then delivering the executable code as output of the compilation tool.

25 Claims, 2 Drawing Sheets

SYSTEM AND PROCESS FOR COMPILING A SOURCE CODE

CROSS-REFERENCE TO RELATED APPLICATIONS

This application claims the benefit of French Application No. 2011657, filed on Nov. 13, 2020, which application is hereby incorporated herein by reference.

TECHNICAL FIELD

Implementations and embodiments of the disclosure relate to the securing of certain aspects of a computer system, such as, for example, the securing of a set of instructions executable by this computer system, in particular in relation to the security against fault injection attacks or in terms of safety.

BACKGROUND

Embodiments apply advantageously but not exclusively to computer systems whereof the processing unit includes for example a microcontroller or a microprocessor.

A program comprises at least one object code consisting of a plurality of machine instructions (or simply "instructions").

A machine instruction is a basic operation of an object code able to be executed by a processor.

The machine instructions may be obtained from a source code with the aid of a compilation tool.

A compilation tool (or "compiler") is a program that converts a source code into an object code. In particular, the source code may comprise functions that are translated into instructions in the object code.

Moreover, the execution of instructions of an object code by a processor is clocked by a clock.

Disturbances on the electronic components of the clock may occur. Such disturbances may affect the execution of instructions and consequently may reduce the safety of the program.

In order to make sure that the program executes correctly, it is possible to control the execution of the sequence of instructions at least at certain strategic steps of the program. This requires the application of specific coding rules. These specific coding rules require a high level of technical skills. Furthermore, the application of these coding rules takes time.

Therefore, there is a need to propose a solution for avoiding a specific coding.

Moreover, a misguided person may succeed in disturbing the execution of instructions of a program by fault injection attack by making the clock used to clock the execution of instructions go wrong.

In particular, by making the clock go wrong, certain instructions may be jumped and therefore are not executed. Other instructions may be executed a plurality of times. When certain function end branch instructions are not executed, it is possible that the execution of the program executes the following function in the code without this function being called.

Thus, by making the clock go wrong, the execution of the program may be uncontrolled, which may pose security problems.

In particular, by disturbing the execution of instructions of a program, a misguided person may succeed in corrupting the program.

In order to counter fault injection attacks, it is possible to perform a control of the instructions performed. It is also possible to duplicate the function calls so as to make sure that they are executed properly.

These solutions have the disadvantage of being very intrusive for the development of the code of the program.

These solutions also have the disadvantage of not being able to predict all of the possible consequences of a fault injection into the execution of the program. Indeed, it is still possible to have a fault injection affecting certain portions of the assembly code for which no control is performed. Therefore, the fault injections may not be detected.

Furthermore, the compiled code is the same for any computer system using a public code. In particular, the compiled code is the same for the same compilation tool using the same level of compilation optimization. The fault injection attack may therefore be easy to reproduce on a plurality of platforms based on the same code.

Therefore, there is a need to make a program more robust to fault injection attacks and/or to external disturbances.

There is also a need to propose a solution for detecting an uncontrolled execution of the program that may in particular result from a fault injection attack.

SUMMARY

According to one aspect, a method for compiling by a compilation tool, or compiler, a source code into a computer-executable code, the compilation tool being implemented within a computer processing unit, comprises receiving the source code as input of the compilation tool and storing the source code in a memory of the processing unit, the compilation tool translating the source code into an object code comprising machine instructions executable by a processor, then the compilation tool introducing, between machine instructions of the object code, additional instructions selected from illegal instructions and no-operation instructions so as to obtain the executable code, then delivering the executable code as output of the compilation tool.

Such a compilation method may be implemented by a compilation tool, that may in particular be executed by a computer. Such a compilation method may be implemented in order to obtain a plurality of executable codes able to be linked in order to obtain a compiled program executable by a computer system comprising a processing unit.

Such a compilation method therefore makes it possible to obtain a modified object code including translated instructions of the source code and additional instructions introduced by the compilation tool.

The compilation method is performed according to a processor with which it is desired that the executable code obtained may be executed. For example, the processor with which it is desired to execute the executable code obtained may be a processor having an ARM type architecture. The source code is then translated into instructions able to be read by such a processor.

In particular, the executable code may be executed by a processor of a microcontroller of the processing unit of the computer system.

Introducing additional instructions between the translated instructions of the source code makes it possible to improve the robustness of the executable code obtained in terms of safety and against the fault injection attacks.

Such a compilation method may be implemented by a compilation tool. In particular, the compilation tool may automatically implement the compilation method proposed during a compilation of a source code.

Such a compilation method makes it possible to facilitate the development of the executable code because the insertion of additional instructions is carried out automatically by the compilation tool.

Furthermore, the execution of the executable code obtained may be carried out by using a flash memory, and not a Random Access Memory (RAM).

An illegal instruction is an instruction having an invalid operational code. This operational code is invalid because it does not correspond to any type of instructions able to be executed by the processor whereon the executable code is executed.

When an illegal instruction is read by the processor, it cannot be executed by the latter. An illegal instruction exception is then emitted.

Thus, by introducing illegal instructions from the translated instructions of the source code, it is possible to detect a malfunction in the execution of the executable code by detecting illegal instruction exceptions.

In particular, it is possible to use a control device configured to detect the illegal instruction exceptions resulting from additional illegal instructions introduced from the translated instructions of the source code.

This control device may also be configured to stop an uncontrolled execution of the executable code, after having detected an illegal instruction exception, then to carry out a securing action to prevent a security problem. The securing action to prevent a security problem may be for example a reinitialization of the processor executing the executable code or an erasure of sensitive data, such as cryptographic keys. The securing action may also be a writing in the Real Time Clock (RTC) registers in order to store in memory a fault injection attack attempt. It is also possible to slow down the processor in order to slow down the attack attempts.

It is possible to only introduce additional illegal instructions. It is also possible to only introduce additional no-operation instructions. It is also possible to combine these different types of additional instructions.

The object code may comprise functions including a set of machine instructions. These functions are initially written in the source code.

In an advantageous implementation, the additional illegal instructions are introduced between functions of the object code.

The introduction of illegal instructions has the advantage of being simple to implement and not very intrusive in the execution of the executable code.

In an advantageous implementation, at least one additional illegal instruction is introduced after a branch instruction of the object code translated from the source code.

For example, when the at least one illegal instruction is inserted between two functions of the object code, said at least one illegal instruction is inserted after an unconditional branch instruction marking the end of the first of these two functions of the object code.

Thus, when the code executes normally, the function end branch instruction is executed and the at least one additional illegal instruction is not read. Furthermore, when the code executes abnormally and when the function end branch instruction is jumped, the at least one additional illegal instruction may be read. The reading of the at least one additional illegal instruction then generates an illegal instruction exception signaling a malfunction in the execution of the executable code.

Moreover, it is possible that unconditional branch instructions are already included in certain functions of the object code. It is then also possible to insert the at least one instruction after a branch instruction included within a function.

Thus, when the code executes normally, the branch instruction within the function is executed and the at least one additional illegal instruction is not read. Furthermore, when this branch instruction is jumped following a malfunction in the execution of the executable code, the at least one illegal instruction is read and an illegal instruction exemption is generated thus signaling a malfunction in the execution of the executable code.

It is also possible to introduce an additional illegal instruction after a conditional branch instruction when it is ensured that the condition for carrying out the branching will be checked during a normal execution of the executable code.

In an advantageous implementation, an additional branch instruction followed by at least one additional illegal instruction are introduced between two machine instructions of the translated object code of the source code.

The introduction of the branch instruction followed by at least one illegal instruction may be performed within a function, at any location between two instructions.

In particular, the branch instruction is introduced just after the first instruction of the two translated instructions of the source code. This branch instruction takes as operand the address of the second instruction from the two translated instructions of the source code.

Thus, when the code executes normally, the branch instruction introduced is executed and the at least one additional illegal instruction is not read. The instruction that is subsequently executed is the next translated instruction of the source code.

Furthermore, when this branch instruction is jumped following a malfunction in the execution of the executable code, the at least one illegal instruction is read and an illegal instruction exemption is generated thus signaling a malfunction in the execution of the executable code.

The branch instruction may be unconditional or conditional when it is ensured that the condition for carrying out the branching will be checked during a normal execution of the executable code.

In particular, in an advantageous embodiment, the translated object code of the source code comprises a comparison instruction followed by a conditional branch instruction. Furthermore, an additional comparison instruction followed by an additional conditional branch instruction is introduced into the object code upstream of the translated comparison instruction of the source code or after the translated conditional branch instruction of the source code, the additional comparison instruction being identical to the translated comparison instruction of the source code and the additional conditional branch instruction being opposite to the conditional branch instruction following the translated comparison instruction of the source code. Moreover, at least one additional illegal instruction is introduced after the last conditional branch instruction from the additional conditional branch instruction and the translated conditional branch instruction of the source code.

Moreover, in an advantageous embodiment, at least one additional illegal instruction is introduced after a function call branch instruction, and at least one addition instruction is introduced into the function, this addition instruction being configured to be able to modify a return address stored in a link register by adding to this return address the number of additional illegal instructions introduced after the call function branch instruction.

In an advantageous implementation, at least two successive additional illegal instructions are introduced between at least two machine instructions of the translated object code of the source code.

It is possible that a reading of an additional illegal instruction is jumped during an uncontrolled execution of the executable code.

Thus, by introducing a number of successive illegal instructions greater than two, the chances of reading an additional illegal instruction during an uncontrolled execution of the executable code are higher. The chances of detecting a malfunction in the execution of the executable code are therefore higher.

In an advantageous implementation, the number of successive additional illegal instructions introduced between at least two machine instructions of the translated object code of the source code is selected randomly.

By introducing a random number of successive additional illegal instructions, it is possible to obtain a different executable code for each compilation of the same source code.

As each executable code obtained from the same source code is different, it is therefore more difficult to perform a fault injection attack having the same effect on the execution of each executable code.

Thus, introducing a random number of successive additional illegal instructions makes it possible to complicate a replication of fault injection attacks on a plurality of different computer systems.

In an advantageous implementation, the introduction of additional instructions is only performed on a portion of the object code.

In an advantageous implementation, the additional instructions are introduced into the object code at locations of the object code selected at least partly randomly.

In particular, the additional instructions are introduced at locations selected randomly from various possible locations.

By randomly introducing the additional instructions, it is possible to obtain a different executable code for each compilation of the same source code.

As each executable code generated from the same source code is different, it is more difficult to perform a fault injection attack having the same effect on the execution of each executable code obtained.

Thus, introducing at least partly randomly the additional instructions makes it possible to complicate a replication of fault injection attacks on a plurality of different computer systems.

According to another aspect it is proposed a compilation tool configured to implement the compilation method as previously described.

According to another aspect it is proposed a computer-readable recording medium whereon a compilation tool is recorded as previously described.

According to another aspect, a computer system comprises a memory including an executable code obtained from a compilation method as previously described, and a processor configured to execute the executable code.

In an advantageous implementation, the computer system further comprises a control device configured to receive an illegal instruction exception able to be generated by the processor when the processor reads an additional illegal instruction during an execution of the executable code, and stop the execution of the executable code after having received an illegal instruction exception.

BRIEF DESCRIPTION OF THE DRAWINGS

Other advantages and features of the invention will become apparent upon examination of the detailed description of non-limiting implementations and embodiments, and of the appended drawings, wherein.

DETAILED DESCRIPTION OF ILLUSTRATIVE EMBODIMENTS

Figure 1:
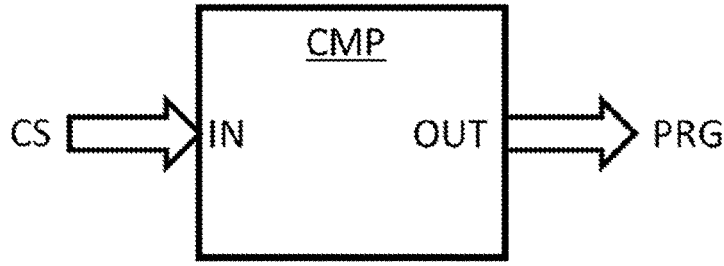
FIG. 1 illustrates an embodiment compilation tool.

FIG. 1 illustrates a compilation tool CMP according to one embodiment. The compilation tool CMP is a compiler or compilation program, implemented within a computer processing unit, for example a computer of the PC type.

The compiler CMP comprises an input IN and an output OUT. The input IN of the compilation tool CMP is configured to receive a source code CS. This source code CS is stored in a memory of the processing unit. The compilation tool CMP is configured to implement a compilation method according to an embodiment and described hereafter. The compilation method makes it possible to obtain as output OUT a computer-executable code PRG. The code PRG is in particular a program executable by a processor.

The processor whereon the executable code may be executed may have an ARM type architecture. The processor may be that of a microcontroller. The processor may also be a microprocessor.

The source code is written according to a programming language, for example in C language. The source code comprises instructions written according to this programming language. The source code may define a plurality of functions each comprising at least one instruction.

The executable code PRG comprises binary instructions executable by a processor.

Figure 2:
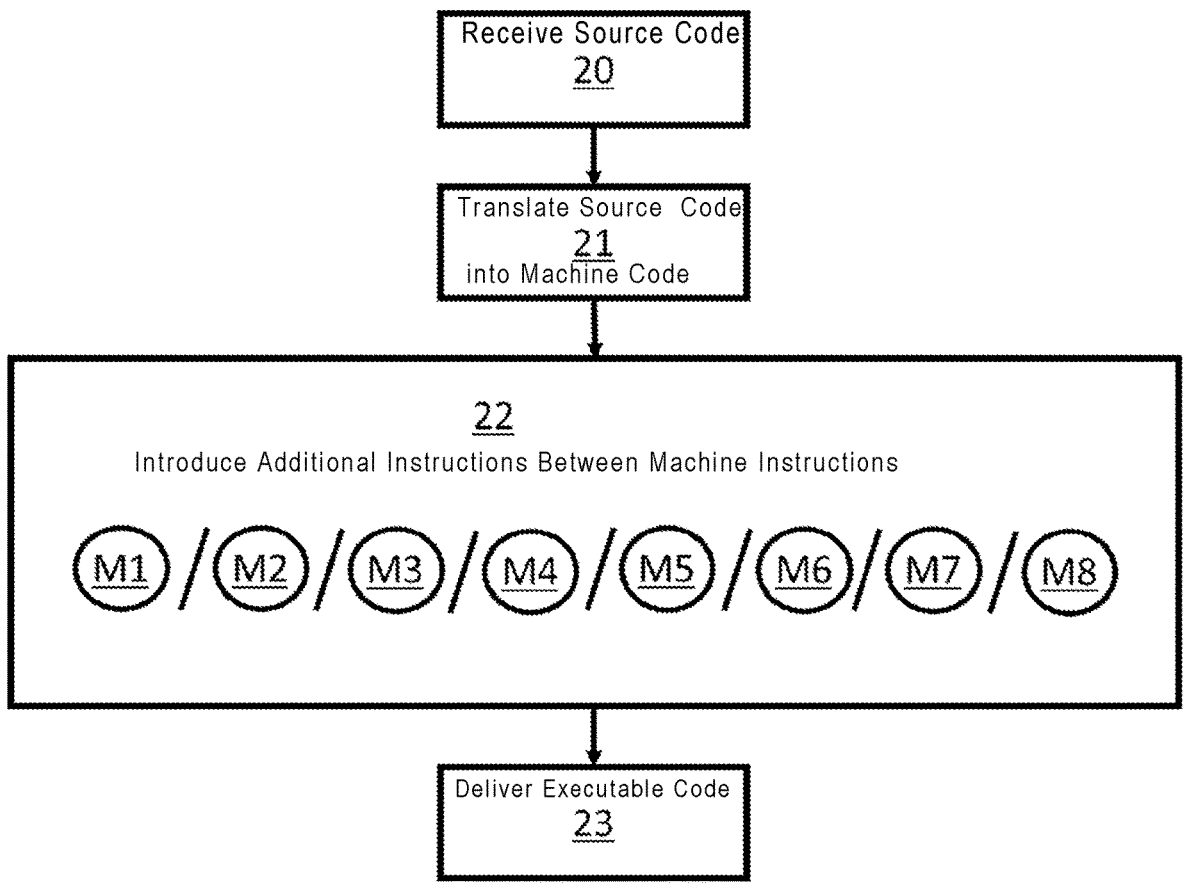
FIG. 2 illustrates an embodiment compilation method implementable by the compilation tool.

A compilation method according to an embodiment able to be implemented by the compilation tool CMP is illustrated in FIG. 2. This compilation method makes it possible to compile a source code CS into a computer-executable code PRG.

Firstly, the method comprises a receiving step 20 wherein the compilation tool receives a source code as input.

The compilation method comprises a step 21 of translating the source code CS received as input of the compilation tool CMP. During this step 21, the compilation tool translates the instructions of the source code into machine instructions executable by the processor with which the executable code PRG must be executed.

The compilation method subsequently comprises a step 22 of introducing additional instructions. During this step 22, additional instructions are introduced between translated machine instructions of the source code. This introduction step 22 makes it possible to obtain the executable code PRG.

The executable code PRG therefore comprises the translated instructions of the source code in step 21 and the additional instructions introduced during step 22.

The additional instructions able to be introduced may comprise illegal instructions and/or no-operation instructions. In particular, it is possible to introduce additional instructions of the same type or of a plurality of different types.

The additional instructions are introduced at locations of the machine instruction code able to be selected from a plurality of possible locations, in particular in a function or between functions of the codes. The locations wherein the additional instructions are introduced may be selected randomly.

The additional instructions may be introduced into the whole of the machine instruction code or only into certain portions of this code. The number thereof may also vary and be selected randomly.

Furthermore, the introduction of additional instructions, or the movement of a literal pool as will subsequently be described, may require an updating of the addresses of the translated instructions of the source code, in particular in the functions and for the function calls. In Examples 3-1 to 3-8 in the appendix described hereafter, the addresses of the translated instructions of the source code have not been updated in order to facilitate the understanding and the comparison with the example of FIG. 2.

The introduction of additional instructions makes it possible to obtain an executable code PRG robust, in particular against fault injection attacks or disturbances external to the processor.

The compilation method subsequently comprises delivery step 23 wherein the executable code PRG is delivered as output of the programming tool.

Examples 3-1 to 3-8 in the appendix illustrate various executable codes able to be obtained by various implementations M1 to M8 of step 22 of the compilation method according to various embodiments, from a source code in C language shown in Example 1 in the appendix.

The source code illustrated is only used in order to facilitate the understanding of the compilation method.

The source code comprises a "main" function, a "function_a" function and a "function_b" function.

The "function_b" function is written after the "function_a" function.

The "main" function is written after the "function_b" function.

The main function comprises a "function_a" function call.

The source code is translated into executable binary instructions by a processor having an ARM architecture. These translated instructions are shown in assembly language in Example 2 in the appendix in order to facilitate the understanding of the compilation method.

As can be noted in Example 2 in the appendix, the translated instructions of the "function_b" function are after the translated instructions of the "function_a" function.

Furthermore, the "function_a" and "function_b" functions each comprise a function end branch instruction shown in assembly language by the "bx lr" ARM instruction (see the instructions 5c and 94) translating the "return" instruction into C language, as shown in Example 1 in the appendix.

Additional instructions are subsequently introduced into the sequence of translated instructions of the source code. Various examples of additional introductions introduced into the sequence of translated instructions of the source code are illustrated in Examples 3-1 to 3-8 in the appendix. The instructions are shown in assembly language in these examples for purposes of understanding.

In the embodiment M1 of step 22 shown in Example 3-1, additional illegal instructions are introduced between the functions. In particular, these additional illegal instructions are introduced after the function end branch instruction (that is to say the "bx lr" instruction) for each function.

These illegal instructions are shown by the expression "<UNDEFINED>".

In this embodiment M1, the same number of additional illegal instructions are introduced after the function end branch instruction of each function. In particular, in this embodiment, three additional illegal instructions are introduced after the function end branch instruction. Preferably, at least two additional illegal instructions are added after the function end branch instruction.

Alternatively, in the embodiment M2 of step 22 shown in Example 3-2, a random number of additional illegal instructions is introduced after the function end branch instruction of each function. Here, for example, two additional illegal instructions are introduced after the function end branch instruction of the "function_a" function, four additional illegal instructions are introduced after the function end branch instruction of the "function_b" function, and five additional illegal instructions are introduced after the function end branch instruction of the "function_a" function. Preferably, at least two additional illegal instructions are added after the function end branch instruction.

The additional illegal instructions introduced may be read by the processor whereon the executable code PRG is executed. The reading of an additional illegal instruction generates an illegal instruction exception.

When the executable code PRG functions correctly the function end branch instruction is executed so that the additional illegal instructions are not read.

These additional instructions may be read if the function end branch instruction is not executed by the processor. This function end branch instruction may in particular be jumped when the processor undergoes a fault injection attack or disturbances external to the processor.

When the function end branch instruction of a function is jumped, it is possible that the processor executes the function located after this jumped function. For example, if the function end branch instruction of the "function_a" function is not executed, the processor may execute the "function_b" function.

Nevertheless, the reading of an additional illegal instruction located after a function end branch instruction makes it possible to generate an illegal instruction exception. As the additional illegal instructions may only be read when the function end branch instruction is not executed, the generation of an illegal instruction exception following the reading of an additional illegal instruction makes it possible to indicate a malfunction in the execution of the executable code PRG.

Introducing at least two additional illegal instructions makes it possible to reduce the chances that the additional illegal instructions are all jumped when the execution of the executable code PRG undergoes a malfunction.

It is also possible to introduce additional illegal instructions within functions, such as in the implementations illustrated in Examples 3-3 and 3-4.

As shown in the implementation M3 of step 22 illustrated in Example 3-3, the compilation method may be adapted to introduce at least one additional unconditional branch instruction followed by at least one additional illegal instruction between two translated instructions of the source code. The additional unconditional branch instruction is therefore located after the first instruction of these two translated instructions of the source code and takes as operand the address of the second instruction of these two instructions. Preferably, at least two additional illegal instructions are introduced after the additional branch instruction. The number of additional illegal instructions after the additional unconditional branch instruction may also be selected randomly.

Introducing a random number of successive additional illegal instructions makes it possible to complicate a replication of fault injection attacks on a plurality of different computer systems.

In particular, in the example illustrated, these additional instructions are introduced between the instructions 34 and 38 of the "function_a" function. The additional unconditional branch instruction points on the address of the instruction 38 of the "function_a" function and is followed by two additional illegal instructions.

Thus, when the executable code PRG executes normally, the additional branch instruction is executed so that the additional illegal instructions are not read.

Nevertheless, when the additional branch instruction is not executed following a malfunction in the execution of the executable code PRG, the additional illegal instructions located after these additional branch instruction are read. Illegal instruction exceptions are then generated. The illegal instruction exceptions may thus be used to detect a malfunction in the execution of the executable code PRG.

Moreover, as shown in the implementation M4 of step 22 shown in Example 3-4, at least one additional illegal instruction may be introduced within a function after a translated unconditional branch instruction of the source code. Preferably, at least two additional illegal instructions are added after a translated unconditional branch instruction of the source code. The number of additional illegal instructions after a translated branch instruction of the source code may also be selected randomly.

In particular, in the example illustrated in Example 3-4, two additional illegal instructions are added after the unconditional branch instructions 2c, 4c and 50 of the "function_a" function.

The unconditional branch instruction 2c is used before a "return" instruction of a first "if" structure of the "function_a" function in the source code. This branch instruction 2c subsequently makes it possible to perform the function end branch instruction 5c translating the "return" instruction.

The branch instruction 4c is used before a "return" instruction of a second "if" structure of the "function_a" function in the source code. This branch instruction 2c subsequently makes it possible to perform the function end branch instruction 5c translating the "return" instruction.

The branch instruction 50 is used to translate the "while (1)" structure of the "function_a" function of the source code.

Thus, when the executable code PRG executes normally, the translated branch instruction of the source code is executed so that the additional illegal instructions that follow it are not read.

Nevertheless, when the translated branch instruction of the source code is not executed following a malfunction in the execution of the executable code PRG, the additional illegal instructions located after this branch instruction are read. Illegal instruction exceptions are then generated. These illegal instruction exceptions may thus be used to detect a malfunction in the execution of the executable code PRG.

Moreover, it is also possible to use certain literal pools as additional illegal instructions within functions, such as in the implementation M5 of step 22 illustrated in Example 3-5.

The literal values are immediate values able to be stored in areas of the executable code. These literal values are not instructions to be executed by the processor and are processed as illegal instructions when they are read. Thus, a literal value may be used as an illegal instruction to detect a malfunction in the execution of an executable code PRG.

For example, a literal value may be used as an illegal instruction, by moving the pool of this literal value after an additional branch instruction introduced from the translated instructions of the source code, or after a translated branch instruction of the source code.

In the example illustrated in Example 3-5, two literal values are used as illegal instructions: the literal value stored at the address <function_a+0x60> and the literal value stored at the address <function_a+0x6c>. An additional illegal instruction is also introduced after this last literal value.

In particular, as can be seen in this Example 3-5, the literal pool has been moved to be placed after the function end branch instruction.

Thus, these two literal values and this additional illegal instruction may be used to detect a malfunction in the execution of the executable code PRG.

More particularly, when the executable code PRG executes normally, the translated function end branch instruction of the source code is executed so that the literal values and the additional illegal instruction that follows them are not read.

Nevertheless, when the function end branch instruction is not executed following a malfunction in the execution of the executable code PRG, the literal values may be read and interpreted as an illegal instruction. Illegal instruction exceptions are in this case generated. Similarly, the reading of the additional illegal instruction results in a generation of an illegal instruction exception. These illegal instruction exceptions may thus be used to detect a malfunction in the execution of the executable code PRG.

The use of literal values as illegal instructions makes it possible to reduce the number of additional illegal instructions to be inserted into the executable code PRG. This therefore makes it possible to reduce the size of the executable code PRG.

Moreover, as shown in the implementation M6 of step 22 shown in Example 3-6, at least one additional illegal instruction may be introduced after a function call. Preferably, at least two additional illegal instructions are introduced after a function call. The number of additional illegal instructions to be introduced after a function call may also be selected randomly.

In particular, in the example illustrated in Example 3-6, three additional illegal instructions are added in the "main" function after the branch instruction b4 ("bl 0<function_a>") used as a "function_a" function call.

The addition of illegal instructions after a function call instruction involves modifying the link register (LR) at the end of the function call. In particular, the link register is modified so as to point on the address of the instruction that follows the additional illegal instructions introduced after the function call instruction.

For example, in the example shown in Example 3-6, in order to modify the link register (LR), an additional instruction is added in the "function_a" function before the function end branch instruction 5c ("bx lr") making it possible to return to the "main" function (translating the "return" instruction in the source code). This additional instruction is an addition instruction ("add lr, lr, #12") making it possible to add to the address contained in the link register (LR) the number of additional illegal instructions introduced after the function call instruction b4. In particular, in Example 3-6, twelve is added to the value of the link register (LR) because three additional illegal instructions have been introduced, the size of each additional illegal instruction being of four bytes.

Thus, when the executable code PRG is executed normally, the branch instruction b4 for calling the "function_a" function is executed. Then, at the end of the execution of the "function_a" function, the processor executes the instruction b8 that follows the additional illegal instructions. The additional instructions are therefore not read.

Nevertheless, when the branch instruction b4 for calling the "function_a" function is not executed following a malfunction in the execution of the executable code PRG, the "function_a" function is not executed and the additional illegal instructions located after this branch instruction are read. Illegal instruction exceptions are then generated. These illegal instruction exceptions may thus be used to detect a malfunction in the execution of the executable code PRG.

Moreover, as shown in the implementation M7 of step 22 shown in Example 3-7, at least one additional illegal instruction may be introduced within a function after a conditional branch instruction (in particular after "beq" or "bne" instructions). The conditional branch instruction may be a translated instruction of the source code or even an instruction added from the translated instructions of the source code. In this last case, a conditional branch instruction is therefore introduced followed by at least one additional illegal instruction from the translated instructions of the source code.

In particular, the additional illegal instructions are added after conditional branch instructions for which the condition of these branches is inevitably checked during a normal execution of the executable code PRG.

More particularly, the conditional branch instructions may for example be used after a comparison instruction.

A comparison instruction makes it possible to compare two values in order to know if these values are equal or not, then to perform certain other instructions according to the result obtained from this comparison. The selection of these other instructions to be performed is carried out thanks to a conditional branch instruction.

In order to make sure that a translated comparison instruction of the source code followed by a first conditional branch instruction is carried out properly during an execution of the executable code PRG, it is possible to introduce that same comparison instruction followed by a second conditional branch instruction opposite to the first conditional branch instruction. This comparison instruction followed by the second branch instruction may be introduced before or after the translated comparison instruction of the source code followed by the first branch instruction.

An additional illegal instruction is introduced following the conditional branch instruction of the comparison the furthest away in the order of execution of the instructions of the executable code PRG. Thus, if neither the first conditional branch nor the second conditional branch is executed, the additional illegal instruction is read. This means that the execution of the executable code PRG did not take place correctly. Indeed, due to the fact that the two conditional branch instructions are opposite, during a normal execution of the executable code PRG, at least one of the two conditional branchings must be carried out.

The reading of the additional illegal instruction generates an illegal instruction exception. This illegal instruction exception may thus be used to detect a malfunction in the execution of the executable code PRG.

In particular, in the example illustrated in Example 3-7, additional instructions are introduced from the translated instructions of the source code in order to check that the comparison instruction c4 and the conditional branch instruction c8 will be executed properly during an execution of the executable code PRG.

In particular, a first series of additional instructions S1 are introduced between the translated instructions co and c4 of the source code. This first series of additional instructions are introduced in order to initialize a zero flag at '1'. In particular, the value of this zero flag is defined by the result of each comparison instruction. The conditional branch instructions use this zero flag to determine if the branching must be carried out or not.

The first series of additional instructions comprises a comparison instruction used to compare the value of the register r3 with that same value of the register r3. The register r3 is the register used for the comparison of the translated instruction c4 of the source code. The two compared values being identical, the introduced comparison instruction makes it possible to determine that these two values are equal. The introduced comparison instruction therefore makes it possible to initialize the zero flag at '1' when it is executed.

The first series of additional instructions further comprises a conditional branch instruction after the comparison instruction, and an additional illegal instruction after this conditional branch instruction. The conditional branch instruction is of "beq" (branch if equal) type and therefore makes it possible to carry out a branching when the result of the comparison that precedes it makes it possible to determine an equality between the two tested values. The conditional branch instruction reads the zero flag to determine if the branching must be carried out. If the introduced comparison instruction that precedes this conditional branch instruction has been executed properly, the zero flag is at 'i' so that the branching is inevitably carried out if the executable code PRG executes normally, and the next instruction having to be executed is the instruction c4. Nevertheless, if the comparison instruction has not been executed, following a malfunction, the branching is not carried out and the additional illegal instruction is read. The reading of this additional illegal instruction generates an illegal instruction exception. This illegal instruction exception makes it possible to detect a malfunction in the execution of the executable code PRG.

The instruction c4, which follows the first series of additional instructions, is a translated comparison instruction of the source code making it possible to compare the value of the register r3 with the value 'o'.

This instruction is followed by a "bne" (branch if not equal) type conditional branch instruction c8. This instruction makes it possible to carry out a branching if the values tested by the comparison carried out from the instruction c4 are not equal.

A second series of additional instructions S2 are introduced after the translated instruction c8 of the source code.

The second series of additional instructions comprises a comparison instruction used to compare the value of the register r3 with the value '1'. The introduced comparison instruction therefore makes it possible to set the zero flag to '0'.

The second series of additional instructions further comprises a conditional branch instruction after the comparison instruction, and an additional illegal instruction after this conditional branch instruction. The conditional branch instruction is of "bne" (branch if not equal) type and therefore makes it possible to carry out a branching when the result of the comparison that precedes it makes it possible to determine a difference between the two tested values. The conditional branch instruction reads the zero flag to determine if the branching must be carried out. If the introduced comparison instruction that precedes this conditional branch instruction has been executed properly, the zero flag is at '0' so that the branching is inevitably carried out if the executable code PRG executes normally, and the next instruction having to be executed is the instruction yy. Nevertheless, if the comparison instruction has not been executed, following a malfunction, the branching is not carried out and the additional illegal instruction is read. The reading of this additional illegal instruction generates an illegal instruction exception. This illegal instruction exception makes it possible to detect a malfunction in the execution of the executable code PRG.

A third series of additional instructions S3 are introduced after the second series of additional instructions S2.

The third series of additional instructions comprises a comparison instruction identical to the translated comparison instruction c4 of the source code.

The third series of additional instructions further comprises a conditional branch instruction after the comparison instruction, and an additional illegal instruction after this conditional branch instruction.

The conditional branch instruction is of the "beq" (branch if equal) type and is therefore opposite to the conditional branch instruction c8.

During a normal execution of the executable code PRG, the comparison instruction of the third series of instructions may only be executed if the comparison carried out from the instruction c4 has made it possible to determine that the register r3 is equal to 'o'. Consequently, during a normal execution of the executable code PRG, the comparison carried out from the comparison instruction introduced into the third series of additional instructions must determine that the value of the register r3, which was not modified, is still equal to 'o'. Thus, during a normal execution of the executable code PRG, the condition of the conditional branch instruction of the third series of additional instructions is checked and the branching must be carried out. The following instruction having to be read is therefore the instruction cc.

Nevertheless, If the additional illegal instruction of the third series of additional instructions is read, this means that the execution of the executable code PRG has undergone a malfunction. The reading of this additional illegal instruction generates an illegal instruction exception. This illegal instruction exception makes it possible to detect a malfunction in the execution of the executable code PRG.

In the implementations wherein additional illegal instructions are introduced from the translated instructions of the source code, a control device DCTRL is provided in the computer system SYS with which the executable code may be executed.

Figure 3:
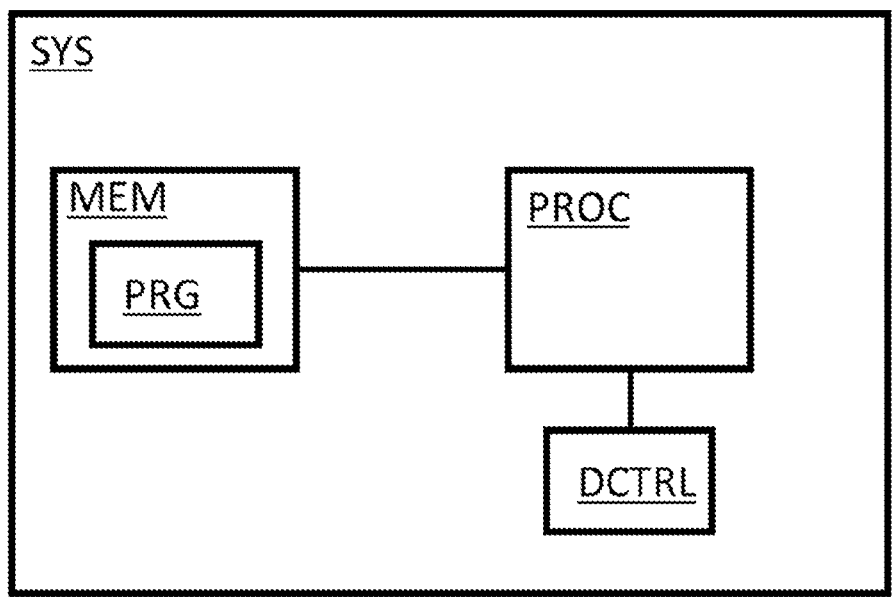
FIG. 3 illustrates an embodiment computer system comprising a non-volatile memory including an executable code obtained from the compilation method.

Such a computer system SYS is shown in FIG. 3. The computer system SYS comprises a non-volatile memory MEM including an executable code PRG obtained from the compilation method previously described.

The computer system SYS further comprises a processor PROC configured to execute the executable code PRG.

The control device DCTRL is configured to detect the illegal instruction exceptions. This control device DCTRL is configured to stop an uncontrolled execution of the executable code PRG, after having detected these illegal instruction exceptions, then to carry out a securing action.

The securing action may be for example a reinitialization of the processor executing the executable code PRG or an erasure of sensitive data, such as cryptographic keys. The securing action may also be a writing in the Real Time Clock (RTC) registers in order to store in memory a fault injection attack attempt. It is also possible to slow down the processor in order to slow down the attack attempts.

The computer system whereon the executable code PRG is executed may comprise such a control device.

The control device may be implemented by software means or hardware means, for example by a logic circuit.

Moreover, as previously seen, the additional instructions introduced in step 22 of the compilation method may be no-operation ("nop") instructions. Such an implementation M8 of step 22 is shown in Example 3-8.

These additional no-operation instructions are introduced within functions at locations selected randomly from the translated instructions of the source code.

Indeed, randomly introducing no-operation instructions makes it possible to obtain a different executable code PRG for each compilation so as to complicate a replication of fault injection attacks on a plurality of computer systems based on the same software implementation.

Introducing additional instructions between the translated instructions of the source code makes it possible to improve the robustness of the compiled executable code PRG in terms of safety and against the fault injection attacks.

Such a compilation method makes it possible to facilitate the development of the executable code because the insertion of additional instructions is carried out automatically by the compilation tool.

Furthermore, the execution of the executable code may be carried out by using a flash memory, and not a Random Access Memory (RAM).

APPENDIX

Example 1: source code (in C language):

```
unsigned int res=0;
void function_a(int val)
{
  if (val==0x1234567)
  {
    res=0xdeadbeef;
    return;
  }
  if (val==0x7654321)
  {
    res=0xbeefdad;
    return;
  }
  while(i);
}
void function_b(void)
{
  res=0;
}
void main(void)
{
  int local=0x1234567;
  function_ a(local);
  while(res);
  /* success */
  return;
}
```

Example 2: translated object code of the source code of Example 1 (in ARM assembly language)

```
00000000 <function_a>:
   0:   push    {fp}            ; (str fp, [sp, #-4]!)
   4:   add     fp, sp, #0
   8:   sub     sp, sp, #12
   c:   str     r0, [fp, #-8]
```

-continued

```
        10:    ldr      r3, [fp, #-8]
        14:    ldr      r2, [pc, #68]      ; 60 <function_a+0x60>
        18:    cmp      r3, r2
        1c:    bne      30 <function_a+0x30>
        20:    ldr      r3, [pc, #60]      ; 64 <function_a+0x64>
        24:    ldr      r2, [pc, #60]      ; 68 <function_a+0x68>
        28:    str      r2, [r3]
        2c:    b        54 <function_a+0x54>
        30:    ldr      r3, [fp, #-8]
        34:    ldr      r2, [pc, #48]      ; 6c <function a+0x6c>
        38:    cmp      r3, r2
        3c:    bne      50 <function_a+0x50>
        40:    ldr      r3, [pc, #28]      ; 64 <function_a+0x64>
        44:    ldr      r2, [pc, #36]      ; 70 <function_a+0x70>
        48:    str      r2, [r3]
        4c:    b        54 <function_a+0x54>
        50:    b        50 <function_a+0x50>
        54:    add      sp, fp, #0
        58:    pop      {fp}               ; (ldr fp, [sp], #4)
        5c:    bx       lr
        60:                                ; <UNDEFINED> instruction: 0x01234567
        64:    andeq    r0, r0, r0
        68:    cdple    14, 10, cr11, cr13, cr15, {7}
        6c:                                ; <UNDEFINED> instruction: 0x001f58d1
        70:    bleq     ffbbf72c <main+0xffbbf690>
00000074 <function_b>:
        74:    push     {fp}               ; (str fp, [sp, #-4]!)
        78:    add      fp, sp, #0
        7c:    ldr      r3, [pc, #20]      ; 98 <function_b+0x24>
        80:    mov      r2, #0
        84:    str      r2, [r3]
        88:    nop                         ; (mov r0, r0)
        8c:    add      sp, fp, #0
        90:    pop      {fp}               ; (ldr fp, [sp], #4)
        94:    bx       lr
        98:    andeq    r0, r0, r0
0000009c <main>:
        9c:    push     {fp, lr}
        a0:    add      fp, sp, #4
        a4:    sub      sp, sp, #8
        a8:    ldr      r3, [pc, #44]      ; dc <main+0x40>
        ac:    str      r3, [fp, #-8]
        b0:    ldr      r0, [fp, #-8]
        b4:    bl       0 <function_a>
        b8:    nop                         ; (mov r0, r0)
        bc:    ldr      r3, [pc, #28]      ; e0 <main+0x44>
        c0:    ldr      r3, [r3]
        c4:    cmp      r3, #0
        c8:    bne      bc <main+0x20>
        cc:    nop                         ; (mov r0, r0)
        d0:    sub      sp, fp, #4
        d4:    pop      {fp, lr}
        d8:    bx       lr
        dc:                                ; <UNDEFINED> instruction: 0x01234567
        e0:    andeq    r0, r0, r0
```

Example 3-1: executable code able to be obtained by a first implementation M1 of step 22 of compilation method (translated into ARM assembly language)

```
00000000 <function_a>:
        0:     push     {fp}               ; (str fp, [sp, #-4]!)
        4:     add      fp, sp, #0
        8:     sub      sp, sp, #12
        c:     str      r0, [fp, #-8]
        10:    ldr      r3, [fp, #-8]
        14:    ldr      r2, [pc, #68]      ; 60 <function_a+0x60>
        18:    cmp      r3, r2
        1c:    bne      30 <function_a+0x30>
        20:    ldr      r3, [pc, #60]      ; 64 <function_a+0x64>
        24:    ldr      r2, [pc, #60]      ; 68 <function_a+0x68>
        28:    str      r2, [r3]
        2c:    b        54 <function_a+0x54>
        30:    ldr      r3, [fp, #-8]
        34:    ldr      r2, [pc, #48]      ; 6c <function a+0x6c>
        38:    cmp      r3, r2
        3c:    bne      50 <function_a+0x50>
```

```
        40:    ldr      r3, [pc, #28]      ; 64 <function_a+0x64>
        44:    ldr      r2, [pc, #36]      ; 70 <function_a+0x70>
        48:    str      r2, [r3]
        4c:    b        54 <function_a+0x54>
        50:    b        50 <function_a+0x50>
        54:    add      sp, fp, #0
        58:    pop      {fp}               ; (ldr fp, [sp], #4)
        5c:    bx       lr
        xx:                                ; <UNDEFINED>
        xx:                                ; <UNDEFINED>
        xx:                                ; <UNDEFINED>
        60:                                ; <UNDEFINED> instruction: 0x01234567
        64:    andeq    r0, r0, r0
        68:    cdple    14, 10, cr11, cr13, cr15, {7}
        6c:                                ; <UNDEFINED> instruction: 0x001f58d1
        70:    bleq     ffbbf72c <main+0xffbbf690>
00000074 <function_b>:
        74:    push     {fp}               ; (str fp, [sp, #-4]!)
        78:    add      fp, sp, #0
        7c:    ldr      r3, [pc, #20]      ; 98 <function_b+0x24>
        80:    mov      r2, #0
        84:    str      r2, [r3]
        88:    nop                         ; (mov r0, r0)
        8c:    add      sp, fp, #0
        90:    pop      {fp}               ; (ldr fp, [sp], #4)
        94:    bx       lr
        xx:                                ; <UNDEFINED>
        xx:                                ; <UNDEFINED>
        xx:                                ; <UNDEFINED>
        98:    andeq    r0, r0, r0
0000009c <main>:
        9c:    push     {fp, lr}
        a0:    add      fp, sp, #4
        a4:    sub      sp, sp, #8
        a8:    ldr      r3, [pc, #44]      ; dc <main+0x40>
        ac:    str      r3, [fp, #-8]
        b0:    ldr      r0, [fp, #-8]
        b4:    bl       0 <function_a>
        b8:    nop                         ; (mov r0, r0)
        bc:    ldr      r3, [pc, #28]      ; e0 <main+0x44>
        c0:    ldr      r3, [r3]
        c4:    cmp      r3, #0
        c8:    bne      bc <main+0x20>
        cc:    flop                        ; (mov r0, r0)
        d0:    sub      sp, fp, #4
        d4:    pop      {fp, lr}
        d8:    bx       lr
        xx:                                ; <UNDEFINED>
        xx:                                ; <UNDEFINED>
        xx:                                ; <UNDEFINED>
        dc:                                ; <UNDEFINED> instruction: 0x01234567
        e0:    andeq    r0, r0, r0
```

Example 3-2: executable code able to be obtained by a second implementation M2 of step 22 compilation method (translated into ARM assembly language)

```
00000000 <function_a>:
        0:     push     {fp}               ; (str fp, [sp, #-4]!)
        4:     add      fp, sp, #0
        8:     sub      sp, sp, #12
        c:     str      r0, [fp, #-8]
        10:    ldr      r3, [fp, #-8]
        14:    ldr      r2, [pc, #68]      ; 60 <function_a+0x60>
        18:    cmp      r3, r2
        1c:    bne      30 <function_a+0x30>
        20:    ldr      r3, [pc, #60]      ; 64 <function_a+0x64>
        24:    ldr      r2, [pc, #60]      ; 68 <function_a+0x68>
        28:    str      r2, [r3]
        2c:    b        54 <function_a+0x54>
        30:    ldr      r3, [fp, #-8]
        34:    ldr      r2, [pc, #48]      ; 6c <function a+0x6c>
        38:    cmp      r3, r2
        3c:    bne      50 <function_a+0x50>
        40:    ldr      r3, [pc, #28]      ; 64 <function_a+0x64>
        44:    ldr      r2, [pc, #36]      ; 70 <function_a+0x70>
        48:    str      r2, [r3]
```

-continued

```
4c:     b       54 <function_a+0x54>
50:     b       50 <function_a+0x50>
54:     add     sp, fp, #0
58:     pop     {fp}              ; (ldr fp, [sp], #4)
5c:     bx      lr
xx:                               ; <UNDEFINED>
xx:                               ; <UNDEFINED>
60:                               ; <UNDEFINED> instruction: 0x01234567
64:     andeq   r0, r0, r0
68:     cdple   14, 10, cr11, cr13, cr15, {7}
6c:                               ; <UNDEFINED> instruction: 0x001f58d1
70:     bleq    ffbbf72c <main+0xffbbf690>
00000074 <function_b>:
74:     push    {fp}              ; (str fp, [sp, #-4]!)
78:     add     fp, sp, #0
7c:     ldr     r3, [pc, #20]     ; 98 <function_b+0x24>
80:     mov     r2, #0
84:     str     r2, [r3]
88:     nop                       ; (mov r0, r0)
8c:     add     sp, fp, #0
90:     pop     {fp}              ; (ldr fp, [sp], #4)
94:     bx      lr
xx:                               ; <UNDEFINED>
xx:                               ; <UNDEFINED>
xx:                               ; <UNDEFINED>
xx:                               ; <UNDEFINED>
98:     andeq   r0, r0, r0
0000009c <main>:
9c:     push    {fp, lr}
a0:     add     fp, sp, #4
a4:     sub     sp, sp, #8
a8:     ldr     r3, [pc, #44]     ; dc <main+0x40>
ac:     str     r3, [fp, #-8]
b0:     ldr     r0, [fp, #-8]
b4:     bl      0 <function_a>
b8:     nop                       ; (mov r0, r0)
bc:     ldr     r3, [pc, #28]     ; e0 <main+0x44>
c0:     ldr     r3, [r3]
c4:     cmp     r3, #0
c8:     bne     bc <main+0x20>
cc:     nop                       ; (mov r0, r0)
d0:     sub     sp, fp, #4
d4:     pop     {fp, lr}
d8:     bx      lr
xx:                               ; <UNDEFINED>
xx:                               ; <UNDEFINED>
xx:                               ; <UNDEFINED>
xx:                               ; <UNDEFINED>
xx:                               ; <UNDEFINED>
dc:                               ; <UNDEFINED> instruction: 0x01234567
e0:     andeq   r0, r0, r0
```

Example 3-3: executable code able to be obtained by a third implementation M3 of step 22 of the compilation method (translated into ARM assembly language)

```
00000000 <function_a>:
0:      push    {fp}              ; (str fp, [sp, #-4]!)
4:      add     fp, sp, #0
8:      sub     sp, sp, #12
c:      str     r0, [fp, #-8]
10:     ldr     r3, [fp, #-8]
14:     ldr     r2, [pc, #68]     ; 60 <function_a+0x60>
18:     cmp     r3, r2
1c:     bne     30 <function_a+0x30>
20:     ldr     r3, [pc, #60]     ; 64 <function_a+0x64>
24:     ldr     r2, [pc, #60]     ; 68 <function_a+0x68>
28:     str     r2, [r3]
2c:     b       54 <function_a+0x54>
30:     ldr     r3, [fp, #-8]
34:     ldr     r2, [pc, #48]     ; 6c <function_a+0x6c>
xx:     b       38 <function_a+0x38>
xx:                               ; <UNDEFINED>
xx:                               ; <UNDEFINED>
38:     cmp     r3, r2
3c:     bne     50 <function_a+0x50>
40:     ldr     r3, [pc, #28]     ; 64 <function_a+0x64>
44:     ldr     r2, [pc, #36]     ; 70 <function_a+0x70>
48:     str     r2, [r3]
4c:     b       54 <function_a+0x54>
50:     b       50 <function_a+0x50>
54:     add     sp, fp, #0
58:     pop     {fp}              ; (ldr fp, [sp], #4)
5c:     bx      lr
60:                               ; <UNDEFINED> instruction: 0x01234567
64:     andeq   r0, r0, r0
68:     cdple   14, 10, cr11, cr13, cr15, {7}
6c:                               ; <UNDEFINED> instruction: 0x001f58d1
70:     bleq    ffbbf72c <main+0xffbbf690>
00000074 <function_b>:
74:     push    {fp}              ; (str fp, [sp, #-4]!)
78:     add     fp, sp, #0
7c:     ldr     r3, [pc, #20]     ; 98 <function_b+0x24>
80:     mov     r2, #0
84:     str     r2, [r3]
88:     nop                       ; (mov r0, r0)
8c:     add     sp, fp, #0
90:     pop     {fp}              ; (ldr fp, [sp], #4)
94:     bx      lr
98:     andeq   r0, r0, r0
0000009c <main>:
9c:     push    {fp, lr}
a0:     add     fp, sp, #4
a4:     sub     sp, sp, #8
a8:     ldr     r3, [pc, #44]     ; dc <main+0x40>
ac:     str     r3, [fp, #-8]
b0:     ldr     r0, [fp, #-8]
b4:     bl      0 <function_a>
b8:     nop                       ; (mov r0, r0)
bc:     ldr     r3, [pc, #28]     ; e0 <main+0x44>
c0:     ldr     r3, [r3]
c4:     cmp     r3, #0
c8:     bne     bc <main+0x20>
cc:     nop                       ; (mov r0, r0)
d0:     sub     sp, fp, #4
d4:     pop     {fp, lr}
d8:     bx      lr
dc:                               ; <UNDEFINED> instruction: 0x01234567
e0:     andeq   r0, r0, r0
```

Example 3-4: executable code able to be obtained by a fourth implementation M4 of step 22 of the compilation method (translated into ARM assembly language)

```
00000000 <function_a>:
0:      push    {fp}              ; (str fp, [sp, #-4]!)
4:      add     fp, sp, #0
8:      sub     sp, sp, #12
c:      str     r0, [fp, #-8]
10:     ldr     r3, [fp, #-8]
14:     ldr     r2, [pc, #68]     ; 60 <function_a+0x60>
18:     cmp     r3, r2
1c:     bne     30 <function_a+0x30>
20:     ldr     r3, [pc, #60]     ; 64 <function_a+0x64>
24:     ldr     r2, [pc, #60]     ; 68 <function_a+0x68>
28:     str     r2, [r3]
2c:     b       54 <function_a+0x54>
xx:                               ; <UNDEFINED>
xx:                               ; <UNDEFINED>
30:     ldr     r3, [fp, #-8]
34:     ldr     r2, [pc, #48]     ; 6c <function_a+0x6c>
38:     cmp     r3, r2
3c:     bne     50 <function_a+0x50>
40:     ldr     r3, [pc, #28]     ; 64 <function_a+0x64>
44:     ldr     r2, [pc, #36]     ; 70 <function_a+0x70>
48:     str     r2, [r3]
4c:     b       54 <function_a+0x54>
xx:                               ; <UNDEFINED>
xx:                               ; <UNDEFINED>
50:     b       50 <function_a+0x50>
xx:                               ; <UNDEFINED>
xx:                               ; <UNDEFINED>
54:     add     sp, fp, #0
58:     pop     {fp}              ; (ldr fp, [sp], #4)
```

-continued

```
5c:     bx      lr
60:             ; <UNDEFINED> instruction: 0x01234567
64:     andeq   r0, r0, r0
68:     cdple   14, 10, c11, cr13, cr15, {7}
6c:             ; <UNDEFINED> instruction: 0x001f58d1
70:     bleq    ffbbf72c <main+0xffbbf690>
00000074 <function_b>:
74:     push    {fp}                    ; (str fp, [sp, #-4]!)
78:     add     fp, sp, #0
7c:     ldr     r3, [pc, #20]           ; 98 <function_b+0x24>
80:     mov     r2, #0
84:     str     r2, [r3]
88:     nop                             ; (mov r0, r0)
8c:     add     sp, fp, #0
90:     pop     {fp}                    ; (ldr fp, [sp], #4)
94:     bx      lr
98:     andeq   r0, r0, r0
0000009c <main>:
9c:     push    {fp, lr}
a0:     add     fp, sp, #4
a4:     sub     sp, sp, #8
a8:     ldr     r3, [pc, #44]           ; dc <main+0x40>
ac:     str     r3, [fp, #-8]
b0:     ldr     r0, [fp, #-8]
b4:     bl      0 <function_a>
b8:     nop                             ; (mov r0, r0)
bc:     ldr     r3, [pc, #28]           ; e0 <main+0x44>
c0:     ldr     r3, [r3]
c4:     cmp     r3, #0
c8:     bne     bc <main+0x20>
cc:     nop                             ; (mov r0, r0)
d0:     sub     sp, fp, #4
d4:     pop     {fp, lr}
d8:     bx      lr
dc:             ; <UNDEFINED> instruction: 0x01234567
e0:     andeq   r0, r0, r0
```

Example 3-5: executable code able to be obtained by a fifth implementation M5 of step 22 of the compilation method (translated into ARM assembly language)

```
00000000 <function_a>:
0:      push    {fp}                    ; (str fp, [sp, #-4]!)
4:      add     fp, sp, #0
8:      sub     sp, sp, #12
c:      str     r0, [fp, #-8]
10:     ldr     r3, [fp, #-8]
14:     ldr     r2, [pc, #68]           ; 60 <function_a+0x60>
18:     cmp     r3, r2
1c:     bne     30 <function_a+0x30>
20:     ldr     r3, [pc, #60]           ; 64 <function_a+0x64>
24:     ldr     r2, [pc, #60]           ; 68 <function_a+0x68>
28:     str     r2, [r3]
2c:     b       54 <function_a+0x54>
30:     ldr     r3, [fp, #-8]
34:     ldr     r2, [pc, #48]           ; 6c <function_a+0x6c>
38:     cmp     r3, r2
3c:     bne     50 <function_a+0x50>
40:     ldr     r3, [pc, #28]           ; 64 <function_a+0x64>
44:     ldr     r2, [pc, #36]           ; 70 <function_a+0x70>
48:     str     r2, [r3]
4c:     b       54 <function_a+0x54>
50:     b       50 <function_a+0x50>
54:     add     sp, fp, #0
58:     pop     {fp}                    ; (ldr fp, [sp], #4)
5c:     bx      lr
60:             ; <UNDEFINED> instruction: 0x01234567
6c:             ; <UNDEFINED> instruction: 0x001f58c11
xx:             ; <UNDEFINED>
64:     andeq   r0, r0, r0
68:     cdple   14, 10, c11, cr13, cr15, {7}
6c:             ; <UNDEFINED>            Art 68
70:     bleq    ffbbf72c <main+0xffbbf690>
00000074 <function_b>:
74:     push    {fp}                    ; (str fp, [sp, #-4]!)
78:     add     fp, sp, #0
7c:     ldr     r3, [pc, #20]           ; 98 <function_b+0x24>
80:     mov     r2, #0
84:     str     r2, [r3]
88:     nop                             ; (mov r0, r0)
8c:     add     sp, fp, #0
90:     pop     {fp}                    ; (ldr fp, [sp], #4)
94:     bx      lr
98:     andeq   r0, r0, r0
0000009c <main>:
9c:     push    {fp, lr}
a0:     add     fp, sp, #4
a4:     sub     sp, sp, #8
a8:     ldr     r3, [pc, #44]           ; dc <main+0x40>
ac:     str     r3, [fp, #-8]
b0:     ldr     r0, [fp, #-8]
b4:     bl      0 <function_a>
b8:     nop                             ; (mov r0, r0)
bc:     ldr     r3, [pc, #28]           ; e0 <main+0x44>
c0:     ldr     r3, [r3]
c4:     cmp     r3, #0
c8:     bne     bc <main+0x20>
cc:     nop                             ; (mov r0, r0)
d0:     sub     sp, fp, #4
d4:     pop     {fp, lr}
d8:     bx      lr
dc:             ; <UNDEFINED> instruction: 0x01234567
e0:     andeq   r0, r0, r0
```

Example 3-6: executable code able to be obtained by a sixth implementation M6 of step 22 of the compilation method (translated into assembly language)

```
00000000 <function_a>:
0:      push    {fp}                    ; (str fp, [sp, #-4]!)
4:      add     fp, sp, #0
8:      sub     sp, sp, #12
c:      str     r0, [fp, #-8]
10:     ldr     r3, [fp, #-8]
14:     ldr     r2, [pc, #68]           ; 60 <function_a+0x60>
18:     cmp     r3, r2
1c:     bne     30 <function_a+0x30>
20:     ldr     r3, [pc, #60]           ; 64 <function_a+0x64>
24:     ldr     r2, [pc, #60]           ; 68 <function_a+0x68>
28:     str     r2, [r3]
2c:     b       54 <function_a+0x54>
30:     ldr     r3, [fp, #-8]
34:     ldr     r2, [pc, #48]           ; 6c <function_a+0x6c>
38:     cmp     r3, r2
3c:     bne     50 <function_a+0x50>
40:     ldr     r3, [pc, #28]           ; 64 <function_a+0x64>
44:     ldr     r2, [pc, #36]           ; 70 <function_a+0x70>
48:     str     r2, [r3]
4c:     b       54 <function_a+0x54>
50:     b       50 <function_a+0x50>
54:     add     sp, fp, #0
58:     pop     {fp}                    ; (ldr fp, [sp], #4)
xx:     add     lr, lr, #12
5c:     bx      lr
60:             ; <UNDEFINED> instruction: 0x01234567
64:     andeq   r0, r0, r0
68:     cdple   14, 10, c11, cr13, cr15, {7}
6c:             ; <UNDEFINED> instruction: 0x001f58d1
70:     bleq    ffbbf72c <main+0xffbbf690>
00000074 <function_b>:
74:     push    {fp}                    ; (str fp, [sp, #-4]!)
78:     add     fp, sp, #0
7c:     ldr     r3, [pc, #20]           ; 98 <function_b+0x24>
80:     mov     r2, #0
84:     str     r2, [r3]
88:     nop                             ; (mov r0, r0)
8c:     add     sp, fp, #0
90:     pop     {fp}                    ; (ldr fp, [sp], #4)
94:     bx      lr
98:     andeq   r0, r0, r0
0000009c <main>:
9c:     push    {fp, lr}
a0:     add     fp, sp, #4
```

```
a4:    sub    sp, sp, #8
a8:    ldr    r3, [pc, #44]     ; dc <main+0x40>
ac:    str    r3, [fp, #-8]
b0:    ldr    r0, [fp, #-8]
b4:    bl     0 <function_a>
xx:                             ; <UNDEFINED>
xx:                             ; <UNDEFINED>
xx:                             ; <UNDEFINED>
b8:    nop                      ; (mov r0, r0)
bc:    ldr    r3, [pc, #28]     ; e0 <main+0x44>
c0:    ldr    r3, [r3]
c4:    cmp    r3, #0
c8:    bne    bc <main+0x20>
cc:    nop                      ; (mov r0, r0)
d0:    sub    sp, fp, #4
d4:    pop    {fp, lr}
d8:    bx     lr
dc:                             ; <UNDEFINED> instruction: 0x01234567
e0:    andeq  r0, r0, r0
```

Example 3-7: executable code able to be obtained by a seventh implementation M7 of step 22 of the compilation method (translated into assembly language)

```
       0000009c <main>:
   9c:    push   {fp, lr}
   a0:    add    fp, sp, #4
   a4:    sub    sp, sp, #8
   a8:    ldr    r3, [pc, #44] ; dc <main+0x40>
   ac:    str    r3, [fp, #-8]
   b0:    ldr    r0, [fp, #-8]
   b4:    bl     0 <function_a>
   b8:    nop                  ; (mov r0, r0)
   bc:    ldr    r3, [pc, #28] ; e0 <main+0x44>
   c0:    ldr    r3, [r3]
          cmp    r3, r3        ;
S1
          beq    <main+0xc4>   ;
   xx:                         ; <UNDEFINED>
   c4:    cmp    r3, #0        ;
   c8:    bne    bc <main+0x20>;
       {  cmp    r3, #1        ;
S2
       {  bne    < main + yy>  ;
   xx:                         ; <UNDEFINED>
       {  yy: cmp r3, #0       ;
S3
       {  beq    <main + cc>
   xx:                         ; <UNDEFINED>
   cc:    nop                  ; (mov r0, r0)
   d0:    sub    sp, fp, #4
   d4:    pop    {fp, lr}
   d8:    bx     lr
   dc:                         ; <UNDEFINED> instruction: 0x01234567
   e0:    andeq  r0, r0, r0
```

Example 3-8: executable code able to be obtained by an eighth implementation M8 of step 22 of the compilation method (translated into assembly language ARM)

```
00000000 <function_a>:
   0:    push   {fp}          ; (str fp, [sp, #-4]!)
   4:    add    fp, sp, #0
   8:    sub    sp, sp, #12
   xx:   nop    nop
   c:    str    r0, [fp, #-8]
  10:    ldr    r3, [fp, #-8]
  14:    ldr    r2, [pc, #68] ; 60 <function_a+ox6o>
  18:    cmp    r3, r2
  xx:    nop    nop
  1c:    bne    30 <function_a+0x30>
  20:    ldr    r3, [pc, #60] ; 64 <function_a+ox64>
  24:    ldr    r2, [pc, #60] ; 68 <function_a+ox68>
  28:    str    r2, [r3]
  2c:    b      54 <function_a+0x54>
  30:    ldr    r3, [fp, #-8]
  34:    ldr    r2, [pc, #48] ; 6c <function_a+0x6c>
  38:    cmp    r3, r2
  xx:    nop    nop
  3c:    bne    50 <function_a+0x50>
  40:    ldr    r3, [pc, #28] ; 64 <function_a+0x64>
  44:    ldr    r2, [pc, #36] ; 70 <function_a+0x70>
  48:    str    r2, [r3]
  4c:    b      54 <function_a+0x54>
  50:    b      50 <function_a+0x50>
  54:    add    sp, fp, #0
  58:    pop    {fp}          ; (ldr fp, [sp], #4)
  xx:    nop    nop
  5c:    bx     lr
  60:                         ; <UNDEFINED> instruction: 0x01234567
  64:    andeq  r0, r0, r0
  68:    cdple  14, 10, cr11, cr13, cr15, {7}
  6c:                         ; <UNDEFINED> instruction: 0x001f58d1
  70:    bleq   ffbbf72c <main+0xffbbf60o>
00000074 <function_b>:
  74:    push   {fp}          ; (str fp, [sp, #-4]!)
  78:    add    fp, sp, #0
  xx:    nop    nop
  7c:    ldr    r3, [pc, #20] ; 98 <function_b+0x24>
  80:    mov    T2, #0
  xx:    nop    nop
  84:    str    r2, [r3]
  88:    nop                  ; (mov ro, ro)
  8c:    add    sp, fp, #0
  90:    pop    {fp}          ; (ldr fp, [sp], #4)
  94:    bx     lr
  98:    andeq  r0, r0, r0
0000009c <main>:
  9c:    push   {fp, lr}
  a0:    add    fp, sp, #4
  a4:    sub    sp, sp, #8
  a8:    ldr    r3, [pc, #44] ; dc <main+0x40>
  ac:    str    r3, [fp, #-8]
  xx:    nop    nop
  b0:    ldr    r0, [fp, #-8]
  b4:    bl     0 <function_a>
  b8:    nop                  ; (mov r0, r0)
  bc:    ldr    r3, [pc, #28] ; e0 <main+0x44>
  c0:    ldr    r3, [r3]
  xx:    nop    nop
  c4:    cmp    r3, #0
  c8:    bne    bc <main+0x20>
  cc:    nop                  ; (mov ro, ro)
  d0:    sub    sp, fp, #4
  d4:    pop    {fp, lr}
  xx:    nop    nop
  d8:    bx     lr
  dc:                         ; <UNDEFINED>instruction: 0x01234567
  e0:    andeq  r0, r0, r0
```

What is claimed is:

1. A method for compiling, by a compilation tool, a source code into a computer-executable code, the compilation tool being implemented within a computer processing unit, the method comprising:
   receiving the source code as an input to the compilation tool;
   storing the source code in a memory of the computer processing unit;
   translating, by the compilation tool, the source code into an object code comprising machine instructions executable by a processor;
   after the translating, introducing, by the compilation tool, between machine instructions of the object code, an introduced branch instruction, followed by additional instructions selected from additional illegal instructions or additional no-operation instructions, so as to obtain the computer-executable code, the introduced branch instruction not being translated from the source code; and after the introducing, delivering the computer-executable code as an output of the compilation tool.

2. The method according to claim 1, wherein the object code comprises functions including a set of machine instructions, and the method comprises introducing the additional illegal instructions between the functions of the object code.

3. The method according to claim 1, further comprising introducing at least one additional illegal instruction after an existing branch instruction of the object code translated from the source code.

4. The method according to claim 1, further comprising introducing, following the introduced branch instruction, at least one additional illegal instruction between two machine instructions of the object code translated from the source code.

5. The method according to claim 1, wherein the object code translated from the source code comprises a translated comparison instruction followed by a translated conditional branch instruction, and the method further comprises:
   introducing an additional comparison instruction followed by an additional conditional branch instruction into the object code upstream of the translated comparison instruction of the source code or after the translated conditional branch instruction of the source code, the additional comparison instruction being identical to the translated comparison instruction of the source code and the additional conditional branch instruction being opposite to the translated conditional branch instruction following the translated comparison instruction of the source code; and
   introducing at least one additional illegal instruction after a last conditional branch instruction from the additional conditional branch instruction and the translated conditional branch instruction of the source code.

6. The method according to claim 1, further comprising:
   introducing at least one additional illegal instruction after a function call branch instruction; and
   introducing at least one addition instruction into the function, the at least one addition instruction being configured to modify a return address stored in a link register by adding to the return address a number of additional illegal instructions introduced after the function call branch instruction.

7. The method according to claim 1, further comprising introducing at least two successive additional illegal instructions between at least two machine instructions of the object code translated from the source code.

8. The method according to claim 7, further comprising randomly selecting a number of successive additional illegal instructions to introduce between the at least two machine instructions of the object code translated from the source code.

9. The method according to claim 1, further comprising performing the introducing of the additional instructions on only a portion of the object code.

10. The method according to claim 1, further comprising introducing the additional instructions into the object code at locations of the object code selected at least partly at random.

11. A non-transitory computer-readable recording medium comprising:
   a compilation tool for compiling a source code into a computer-executable code, the compilation tool configured to:
      receive the source code as an input;
      store the source code in a memory of a computer processing unit;
      translate the source code into an object code comprising machine instructions executable by a processor;
      after the translating, introduce between machine instructions of the object code, an introduced branch instruction, followed by additional instructions selected from additional illegal instructions or additional no-operation instructions, so as to obtain the computer-executable code, wherein the introduced branch instruction is not translated from the source code; and
      after the introducing, deliver the computer-executable code as an output.

12. The non-transitory computer-readable recording medium according to claim 11, wherein the object code comprises functions including a set of machine instructions, and wherein the compilation tool is configured to introduce the additional illegal instructions between the functions of the object code.

13. The non-transitory computer-readable recording medium according to claim 11, wherein the compilation tool is configured to introduce at least one additional illegal instruction after an existing branch instruction of the object code translated from the source code.

14. The non-transitory computer-readable recording medium according to claim 11, wherein the compilation tool is configured to introduce, following the introduced branch instruction, at least one additional illegal instruction between two machine instructions of the object code translated from the source code.

15. The non-transitory computer-readable recording medium according to claim 11, wherein the object code translated from the source code comprises a translated comparison instruction followed by a translated conditional branch instruction, and wherein the compilation tool is configured to:
   introduce an additional comparison instruction followed by an additional conditional branch instruction into the object code upstream of the translated comparison instruction of the source code or after the translated conditional branch instruction of the source code, the additional comparison instruction being identical to the translated comparison instruction of the source code and the additional conditional branch instruction being opposite to the translated conditional branch instruction following the translated comparison instruction of the source code; and
   introduce at least one additional illegal instruction after a last conditional branch instruction from the additional conditional branch instruction and the translated conditional branch instruction of the source code.

16. The non-transitory computer-readable recording medium according to claim 11, wherein the compilation tool is configured to:
   introduce at least one additional illegal instruction after a function call branch instruction; and
   introduce at least one addition instruction into the function, the at least one addition instruction being configured to modify a return address stored in a link register by adding to the return address a number of additional illegal instructions introduced after the function call branch instruction.

17. The non-transitory computer-readable recording medium according to claim 11, wherein the compilation tool is configured to introduce at least two successive additional illegal instructions between at least two machine instructions of the object code translated from the source code.

18. A computer system comprising:
a non-transitory memory including a computer-executable code obtained from a source code by a compilation tool configured to:
   receive the source code as an input;
   store the source code in a memory of a computer processing unit;
   translate the source code into an object code comprising machine instructions executable by a processor;
   after the translating, introduce between machine instructions of the object code, an introduced branch instruction, followed by additional instructions selected from additional illegal instructions or additional no-operation instructions, so as to obtain the computer-executable code, wherein the introduced branch instruction is not translated from the source code; and
   after the introducing, deliver the computer-executable code as an output; and
the processor, configured to execute the computer-executable code.

19. The computer system according to claim 18, further comprising a control device configured to:
   receive an illegal instruction exception generated by the processor in response to the processor reading an additional illegal instruction during an execution of the computer-executable code; and
   stop the execution of the computer-executable code after receiving the illegal instruction exception.

20. The computer system according to claim 18, wherein the object code comprises functions including a set of machine instructions, and wherein the compilation tool is configured to introduce the additional illegal instructions between the functions of the object code.

21. The computer system according to claim 18, wherein the compilation tool is configured to introduce at least one additional illegal instruction after an existing branch instruction of the object code translated from the source code.

22. The computer system according to claim 18, wherein the compilation tool is configured to introduce, following the introduced branch instruction, at least one additional illegal instruction between two machine instructions of the object code translated from the source code.

23. The computer system according to claim 18, wherein the object code translated from the source code comprises a translated comparison instruction followed by a translated conditional branch instruction, and wherein the compilation tool is configured to:
   introduce an additional comparison instruction followed by an additional conditional branch instruction into the object code upstream of the translated comparison instruction of the source code or after the translated conditional branch instruction of the source code, the additional comparison instruction being identical to the translated comparison instruction of the source code and the additional conditional branch instruction being opposite to the translated conditional branch instruction following the translated comparison instruction of the source code; and
   introduce at least one additional illegal instruction after a last conditional branch instruction from the additional conditional branch instruction and the translated conditional branch instruction of the source code.

24. The computer system according to claim 18, wherein the compilation tool is configured to:
   introduce at least one additional illegal instruction after a function call branch instruction; and
   introduce at least one addition instruction into the function, the at least one addition instruction being configured to modify a return address stored in a link register by adding to the return address a number of additional illegal instructions introduced after the function call branch instruction.

25. The computer system according to claim 18, wherein the compilation tool is configured to introduce at least two successive additional illegal instructions between at least two machine instructions of the object code translated from the source code.

* * * * *